(No Model.)

A. C. HARRIS.
GALVANIC BATTERY.

No. 341,907. Patented May 18, 1886.

Witnesses.
W. D. Egbert.
S. E. E. Stevens.

Inventor
Alonzo C. Harris.
Per W. H. Stevens, Atty.

UNITED STATES PATENT OFFICE.

ALONZO C. HARRIS, OF LOUISVILLE, KENTUCKY.

GALVANIC BATTERY.

SPECIFICATION forming part of Letters Patent No. 341,907, dated May 18, 1886.

Application filed November 11, 1884. Renewed April 6, 1886. Serial No. 198,042. (No model.)

*To all whom it may concern:*

Be it known that I, ALONZO C. HARRIS, a citizen of the United States, residing at Louisville, in the county of Jefferson and State of Kentucky, have invented certain new and useful Improvements in Galvanic Batteries; and I do hereby declare the following to be a full, clear, and exact description of the invention, such as will enable others skilled in the art to which it appertains to make and use the same.

This invention relates to that class of galvanic batteries which are made in a portable form in order that they may be readily moved to any part of a house to be used upon invalids, and that they may be easily carried from house to house by physicians and others.

The object of the invention is to provide means whereby the elements of a galvanic battery may be removed from the cells to stop their action when not required for use; also to prevent the exciting-liquid from being slopped out of the cells in transportation.

To this end my invention consists in the construction and combination of parts forming a galvanic battery, hereinafter described and claimed, reference being had to the accompanying drawings, in which—

Figure 1:
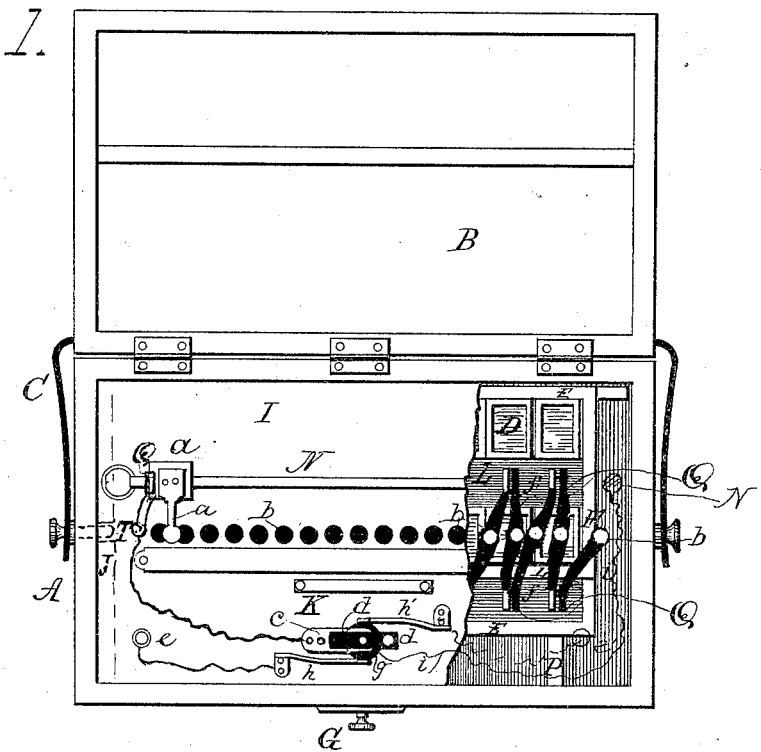
Figure 2:
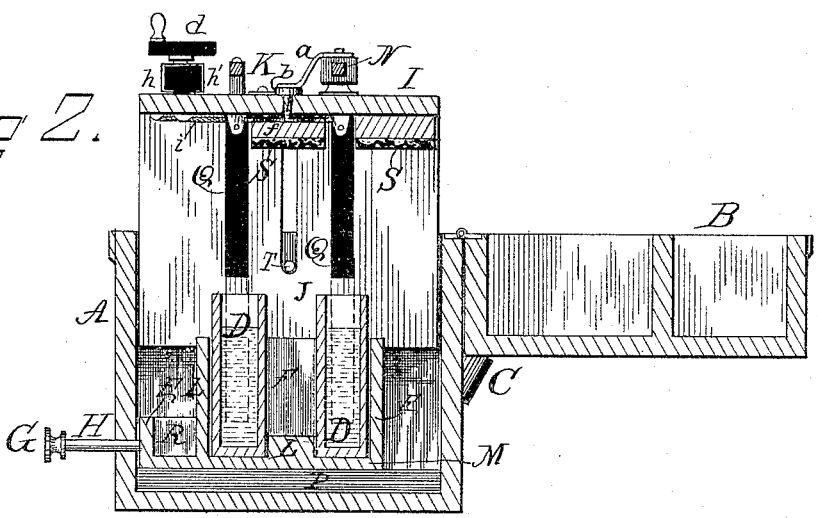

Figure 1 is a plan view of my battery, partly broken away to expose the interior, and Fig. 2 is a transverse vertical section of the same.

A represents the box or case of the battery, provided with a hinged lid, B, and a handle-strap C. Of the details shown only a part are essential to this invention the rest being shown in order that the relation of the invention to the general construction of a battery may be understood.

D represents one or more series of cells arranged to stand vertically in one or more lines in a tray or drawer, R, having side strips, E, end strips, F, partitions L, and a bottom, M. This drawer may be slid forward or backward in the box on the cleats P by means of the external knob, G, and a connecting-rod, H.

I represents a table fitted neatly within the box and provided with end pieces, J, to rest on the bottom thereof to support the adjoining parts of the battery.

K and N are metallic bars, secured to the table by the studs O, which hold the bars raised about half an inch above the table. These bars serve in the present invention as handles by which the table and its attachments may be raised, as shown in Fig. 2.

Q represents one or more series of pairs of elements hung to the table I to be brought in connection with other parts of the battery by suitable wires, switches, &c. Each series of these elements registers with a series of cells when the cells are brought beneath them, so as to enter the cells when lowered, as shown in dotted lines. The cells are in position to register with the elements when the drawer holding the cells is drawn forward and the knob G is far out. When the battery is in its normal or resting position, the drawer and cells are back, as shown in full lines in Fig. 2, and the different series of elements are between or to the front of the different series of cells.

To put the battery in working condition, the operator places his thumb against the short bar K and his fingers against the long bar N, and uses these bars as a handle by which to raise the table and its attachments to the position shown in Fig. 2. Then with his other hand he seizes the knob G and pulls the cells forward. Then he lowers the table and the elements will pass down into the cells, and if there be exciting-fluid in them the battery is ready for use. The table completely fills the box and thereby covers the cells, so that no fumes can escape; but the position of the cells, whether ready to act or not, may be known by the position of the knob G.

S represents a continuous cushion of material suitable to stop the mouths of the cells and not be corroded or in any way injured by the exciting-fluid that may be slopped up against the cushion in transportation. These cushions are placed between the different series of elements to act as stoppers to the cells when the battery is not in use.

The end pieces, J, of the table are provided with vertical slots, not open at their lower ends, to slide upon screws T and be held in the box thereby. By turning these screws part way out the table is free to be entirely removed from the box. When the screws are in place, the table can be raised only high enough to free the elements from the cells. A drawer with a single cell or a single series or row of cells may be arranged to register with a single pair of elements or with a single series or row of pairs of elements; or the drawer may contain two or more series or rows of cells arranged at such a distance apart that two or more series or rows of elements will register with them and enter them when the drawer is in the position for the battery to act, and will register with and hang in the spaces between the rows of cells or beside the rows of cells when they are in their normal position.

In the normal position the drawer will catch any fluid that may drop from the elements, and should this in course of time damage the wood of the drawer it may be replaced at a trifling expense.

In order to throw in a greater or less number of cells, according to the will of the operator, I have provided the following-described arrangement of parts.

The cells D are placed in two ranks. When in service, each cell contains a zinc and a carbon element.

$f$ represents a series of metallic yokes, each yoke coupling together a carbon in one rank with a zinc in the other rank.

$e$ $e'$ are binders for the terminals.

$d$ is a pole-changer journaled on vertical metallic pivots insulated by a rubber cylinder, $g$. The lower pivot is provided with a plate extending up one side of the insulator, and the upper pivot is provided with a similar plate extending down the other side of the insulator.

$c$ is a bent plate secured to the table I, serving as a bearing to the upper pivot.

$h$ and $h'$ are spring-plates bearing against the cylinder $g$, to contact with either of the said pivot-plates.

The bar N, on which the switch $a$ slides, is secured to the table I by posts, one of which is connected by a wire, $i$, with the lower pivot of the pole-changer $d$.

$b$ represents a series of metallic buttons, each of which is fixed through the table I to one of the yokes $f$. An arm of the switch $a$ extends onto the line of buttons $b$, and by sliding along the bar N it may come in contact with any button, thereby cutting in the circuit as many cells as may be desired.

Electric connection is made between the parts as follows: Suppose the pole-changer is set to connect spring $h$ with pole $c$. Let us begin with the left-hand terminal binder, $e$, from which we follow a wire to the spring $h$; thence up through one pivot of the pole-changer to the plate $c$; thence by wire to the zinc of the first cell at the left in the rear rank through the fluid to the carbon; now out of the cell across by a yoke, $f$, to a zinc in the first cell in the front rank, through the fluid to the carbon across by a yoke to the zinc of the second rear cell, through fluid to the carbon and yoke, and so on until we arrive at the yoke connected with that button $b$ on which the switch $a$ rests. The switch cuts the remaining cells out of circuit, and turns the latter at this point upon the bar N, which is connected by wire $i$ with the lower pivot of the pole-changer, whence it goes up through the spring $h'$ and a wire to the binding-post $e'$ of the right-hand terminal, from which it passes through the exterior circuit to the first-named binding-post $e$. The last carbon at the right is connected with the last button $b$.

What I claim as my invention, and desire to secure by Letters Patent, is—

1. The combination, with a box, a table fitted to be raised and lowered therein, and battery elements secured to the table to depend therefrom, of a drawer or drawers fitted in the box to slide transversely thereto, an external knob or knobs connected with the drawer or drawers, whereby the latter may be slid to and fro, and battery-cells in the drawer or drawers adapted to register with the said elements in one position of the drawer or drawers, and adapted to stand beside the elements when the drawer or drawers are in another position, substantially as shown and described.

2. The combination, with a box, a drawer or drawers containing battery-cells and fitted to slide in the box transversely, a table fitted to be raised and lowered in the box, and battery elements depending from the table and adapted to enter the cells in one position thereof, and to hang beside the cells in another position thereof, and a pad or cushion secured to the table beside the elements in a position to register with and rest upon the said cells to cover them when the elements are not in them, substantially as described, for the purpose specified.

3. The combination of two ranks of battery-cells, a zinc and a carbon element in each cell, a series of metallic yokes each connecting the zinc of one cell with the carbon of the adjacent cell in the other rank, a table over the cells, a series of metallic buttons passing through the table, each button connected with one of the said yokes, a metallic slide-bar fixed above the table on posts passing through it, a switch fitted to slide upon the said bar, and having an arm adapted to contact with any one of the said series of buttons, and metallic connections between the said bar and one terminal and between one of the end elements and the other terminal, substantially as shown and described, whereby any number of the cells may be cut into the electric circuit, as set forth.

In testimony whereof I affix my signature in presence of two witnesses.

ALONZO C. HARRIS.

Witnesses:
JOHN B. GREEN,
LOUIS EGGERS.